UNITED STATES PATENT OFFICE.

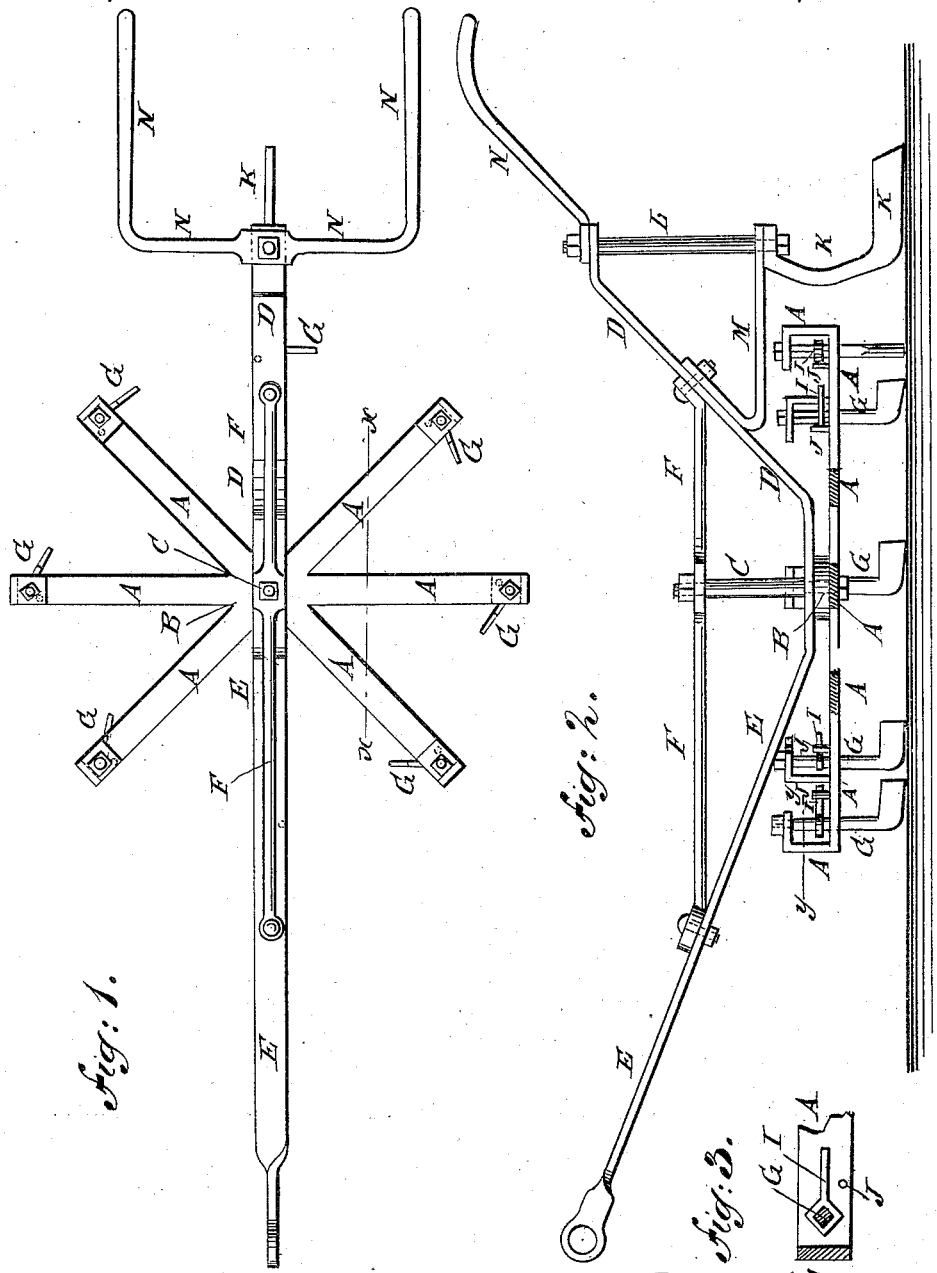

JOHN T. CAMPBELL, OF ROCKVILLE, INDIANA.

REVOLVING CULTIVATOR.

SPECIFICATION forming part of Letters Patent No. 329,137, dated October 27, 1885.

Application filed February 5, 1885. Serial No. 155,001. (No model.)

*To all whom it may concern:*

Be it known that I, JOHN T. CAMPBELL, of Rockville, in the county of Parke and State of Indiana, have invented a new and useful Improvement in Revolving Cultivators, of which the following is a full, clear, and exact description.

Reference is to be had to the accompanying drawings, forming a part of this specification, in which similar letters of reference indicate corresponding parts in all the figures.

Figure 1 is a plan view of one of my revolving cultivators. Fig. 2 is a sectional side elevation of the same, taken through the line $x\,x$, Fig. 1. Fig. 3 is a sectional plan view of a part of the same enlarged, taken through the line $y\,y$, Fig. 2. Fig. 4 is a side elevation of one of the cultivator-teeth enlarged.

The object of this invention is to facilitate and promote thoroughness in cultivating small plants, loosening the soil, and covering grain.

The invention relates to a revolving cultivator constructed with a horizontal circular frame pivoted to a frame, and provided with spring-teeth having projecting blades, and with stop arms and pins and a rudder, whereby the said circular frame will be made to revolve, causing the part of the said circular frame next the row of plants to move forward faster than the advance of the machine, and the cultivator can be made to advance in a straight line, as will be hereinafter fully described, and then pointed out in the claims.

A represents eight (more or less) radial arms, each one foot (more or less) in length, and attached at their inner ends to a hub, B, which is pivoted to the lower end of a short vertical shaft, C, the radial arms and the hub forming a wheel or circular frame. The vertical shaft C is attached to the frame of the machine, which is formed of the rear bar, D, the draw-bar E, and the brace F. The rear bar, D, and the draw-bar E can be formed in one piece, as shown in Fig. 2, or can be formed separate and bolted or riveted to each other, or otherwise rigidly connected. The rear bar, D, and the draw-bar E incline upward from the foot of the vertical shaft C, or from points at a little distance from the said shaft, and are strengthened in position by the brace F, the ends of which are bolted, riveted, or otherwise firmly secured to the said rear bar, D, and draw-bar E. The outer ends of the radial arms A are bent upward at right angles, and then inward at right angles, and to the said ends are pivoted eight (more or less) steel teeth, G, which are made with a coil, H, as shown in Fig. 4, at the lower sides of the arms A, to allow the said teeth to yield should they strike a root, stone, or other obstruction, and thus prevent the said teeth or the frame from being broken. The lower parts of the teeth G are bent to the rearward, and are widened vertically, as shown in Fig. 2, forming blades. The sections of the teeth G that pass through the upper and lower parts of the outer ends of the radial arms A are made round, so that they will turn freely, and the sections between the said upper and lower parts of the said ends are made square, to correspond with the square eyes of the arms I, which are fitted loosely upon the said square sections. The arms I project diagonally with respect to their eyes, as shown in Fig. 3.

To the arms A are attached pins J in such positions that the arms I will strike against them when the teeth G have turned so far in one direction as to bring the blades of the said teeth G into radial positions, but will allow the said teeth to turn freely in the other direction until the arms I come in contact with the edges of the upright parts of the radial arms A. When it is desired to have the circular frame A B revolve in the other direction, the arms I are raised, swung over the pins J, and allowed to drop at the other side of the said pins J. The revolving cultivator is made to move forward in a straight line by a rudder, K, attached to or formed upon a stem or vertical rod, L, the lower part of which is pivoted in a bearing in the rear end of an arm or bracket, M. The forward end of the bracket M is bent to fit against and is bolted, riveted, or otherwise secured to the inclined rear bar, D. The upper end of the rudder-stem L is pivoted to the rearwardly-projecting upper end of the inclined rear bar, D.

To the upper end of the rudder-stem L is attached the center of a bar, N, the end parts of which are bent to the rearward, are inclined upward and rearward, and their upper ends are curved to the rearward, so that the said bent bar N will serve as handles to control the rudder K, and thus guide the machine.

With this construction, when the cultivator is drawn forward, that side of the circular frame A B upon which the blades of the teeth G are held from swinging back by the arms I and pins J will be held by the said blades from moving forward, while the other side will move forward more quickly, the teeth G describing curved lines, and their blades swinging back and offering less obstruction to the advance of the side of the circular frame, each tooth G checking the part of the circular frame to which it is attached as soon as the rotation of the said frame has brought the said tooth into such a position that the advance of the cultivator will cause the blade of the said tooth to engage with the ground and serve as a pivot, about which the circular frame A B swings forward.

The machine is designed to be so arranged that the rapidly-moving part of the circular frame A B will be next the row of plants. With this construction the curved forward sweep of the teeth G will cause the said teeth to push all clods and lumps away from the plants, and at the same time to thoroughly loosen the soil.

The cultivators can be used singly, a single horse being attached to the draw-bar E; or two cultivators can be used at a time, the draw-bars E being attached to the carriage-frame of an ordinary wheel-cultivator; or a single cultivator can be connected with an ordinary turn-plow to pulverize the furrow-slice as it is turned.

Having thus fully described my invention, I claim as new and desire to secure by Letters Patent—

1. The combination, in a revolving cultivator, of a fixed frame, a horizontal circular frame pivoted to said fixed frame, spring-teeth swiveled in said circular frame, and stop arms and pins, whereby the said circular frame will be made to revolve, causing the part of the said circular frame next the row of plants to move forward faster than the advance of the cultivator, as set forth.

2. In a revolving cultivator, the combination, with the radial arms of the pivoted circular frame A B and the spring-teeth G, having rearwardly-projecting blades, of the stop-arms I and pins J, substantially as herein shown and described, whereby the blades of the teeth upon one part of the circular pivoted frame will engage with the ground, and the blades of the teeth upon the other part of the said circular pivoted frame will swing back and oppose very little obstruction to the movement of the said frame, as set forth.

3. In a revolving cultivator, the teeth G, made, substantially as herein shown and described, with projecting blades on their lower ends, and with spring-coils in their shanks, whereby the said teeth, when in one position, will be obstructed by the soil, and when in another position can move through the soil freely, as set forth.

4. In a revolving cultivator, the combination, with the radial arms A of the pivoted circular frame and the teeth G, of the stop-arms I, having eyes, and the stop-pins J, substantially as herein shown and described, whereby the said teeth will be turned successively into position to be obstructed by the soil, and then allowed to swing back, as set forth.

JOHN T. CAMPBELL.

Witnesses:
HENRY B. CORD,
FRANK WHITE.